May 19, 1964 W. J. MINARIK 3,134,065
POSITIVE-FEEDBACK D.C. MOTOR SPEED CONTROL CIRCUITS
Filed July 20, 1962 2 Sheets-Sheet 1

NORMAL ARMATURE VOLTAGE

ARMATURE VOLTAGE (WITH HUNTING ACTION)

INVENTOR.
WILLIAM J. MINARIK
BY Gene W. Anant
ATTORNEY

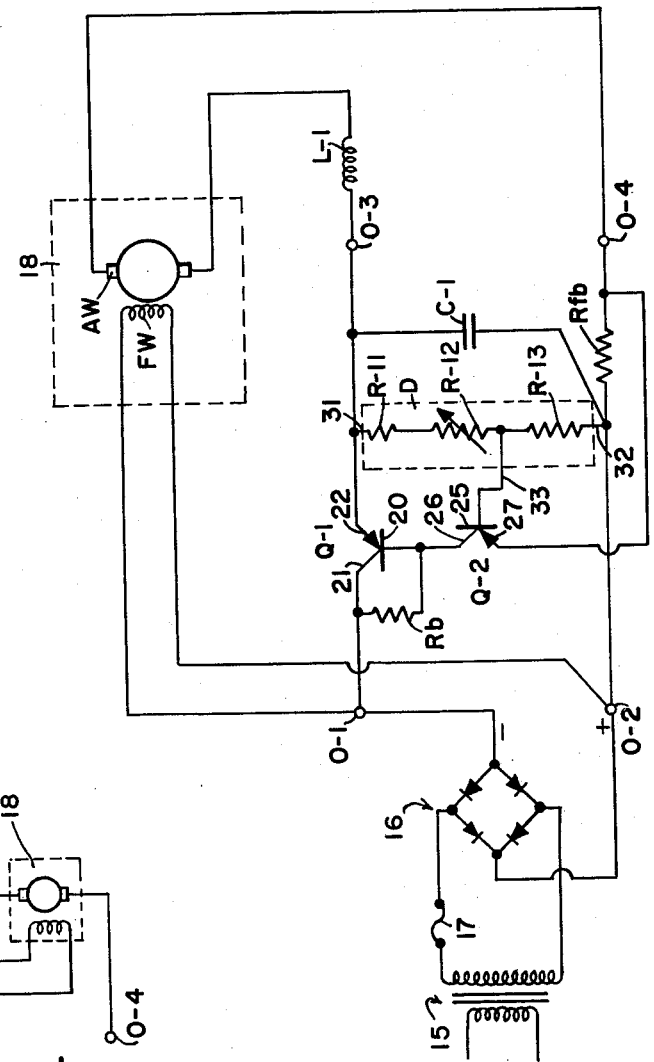

United States Patent Office
3,134,065
Patented May 19, 1964

3,134,065
POSITIVE-FEEDBACK D.C. MOTOR SPEED
CONTROL CIRCUITS
William J. Minarik, 5131 Dahlia Drive,
Los Angeles 41, Calif.
Filed July 20, 1962, Ser. No. 213,842
9 Claims. (Cl. 318—332)

The present invention relates to speed control circuits for direct current motors, in which a voltage developed in response to the flow of motor armature current is fed back in a regenerative phase relationship to a D.C. amplifier that is coupled between the energy source and the motor armature for controlling the flow of current thereto.

The present application is a continuation-in-part of my prior co-pending application Serial No. 96,412 filed March 17, 1961; and also of my prior co-pending application Serial No. 146,520 filed October 20, 1961; both of which have been subsequently abandoned.

The novel circuits of the present invention are generally incorporated in a motor controller package which is adapted for direct connection to an alternating current supply line, and which then rectifies the alternating current to the extent necessary, and supplies a substantially fixed voltage to the motor field winding and a varying voltage to the motor armature. The primary significance of the present invention lies in the manner and means for controlling the voltage that is supplied to the motor armature.

One of the problems in regulating the speed of a direct current motor is that the armature presents a capacitive input to the power supply. This capacity effect increases with the armature speed. Thus the nature of the electrical load imposed by the motor upon its driving circuit changes as a function of both the speed and the mechanical loading of the motor itself.

Another difficult problem is posed by the basic nature of the speed regulation requirement. An increase in the mechanical loading on the motor causes an increase in armature current and hence an increased internal voltage drop. Since field voltage is held constant, in order to hold the motor speed constant it is necessary to increase the applied armature voltage sufficiently to compensate for the increased internal voltage drop, and it then becomes necessary to use a feedback circuit having regenerative characteristics. As is well known, regenerative feedback circuits tend to be oscillatory. In the situation at hand the changes which occur from time to time in the mechanical loading of the motor cause corresponding changes in electrical energy demands, and thus inject into the rectifying and regulating circuit electrical oscillations having frequencies in the range of a few cycles per second, which when amplified by the regenerative feedback circuit result in a hunting action of the motor.

A primary concern of the present invention is being able to maintain the motor speed constant under conditions of varying load. However, another basic premise of the invention is that it must be possible to initially select a desired operating speed of the motor, by setting the armature voltage to a particular value, and to thereafter maintain the motor speed constant as the load torque varies.

Where the direct current motor itself is of small size and expense it is desired that the size and cost of its associated control apparatus be minimized accordingly. Thus there is presented the need for incorporating into a small and inexpensive package adequate circuitry for rectifying the alternating supply energy, filtering it, adjusting the armature voltage to a selected value to achieve a desired speed setting of the motor, and regulating the armature voltage in response to load changes so as to maintain the speed at a constant value.

One form of the invention includes a power transformer having a fixed voltage output and a variable voltage output. The fixed voltage output supplies a separate rectifier which energizes the field winding, hence the field winding of the motor operates under a fixed voltage at all times. The variable voltage output supplies energy to a rectifying and regulating circuit which controls the motor armature. The setting of the variable voltage output of the power transformer is selected with reference to the motor operating speed that is desired, and changes in mechanical loading of the motor are then compensated for by the rectifying and regulating circuit.

Another form of the invention is especially adapted for motors having small power capacity, such as one-fourth horsepower or less. In this form of the invention a single rectifier is utilized in conjunction with a power transformer to provide a source of rectified energy. A D.C. amplifier coupled in series between the rectifier and the motor armature is utilized not only to compensate for changes in motor load during the operation of the motor, but is also utilized to accomplish the necessary change in armature operating voltage at the time that the armature speed is initially selected.

One object of the invention, therefore, is to provide an electrical circuit for controlling the speed of a direct current motor, which is capable of initially selecting any one of a wide range of motor speeds, and which is capable of thereafter maintaining the selected speed despite wide variations in torque load.

Another object of the invention is to provide a speed control circuit for a direct current motor which is compact, reliable, and inexpensive.

A further object of the invention is to provide a combined power supply and speed regulating circuit for a direct current motor, in which the rectifying, filtering, and speed regulating elements of the circuit are efficiently combined in a cooperative manner.

Still another object of the invention is to provide a circuit of the above type which includes effective means for inhibiting undesirable oscillations that would otherwise be induced in the electrical circuit by changes in the mechanical loading on the motor.

Yet a further object of the invention is to provide a speed control circuit for a direct current motor which is capable of being used in conjunction with an unfiltered power supply.

The objects and advantages of the invention will be more readily understood from the following description considered in conjunction with the accompanying drawings, in which:

FIG. 3 is an electrical schematic diagram of a second form of the invention; and FIG. 4 is an electrical schematic diagram representing a modified form of the circuit of FIG. 3.

Figure 1:
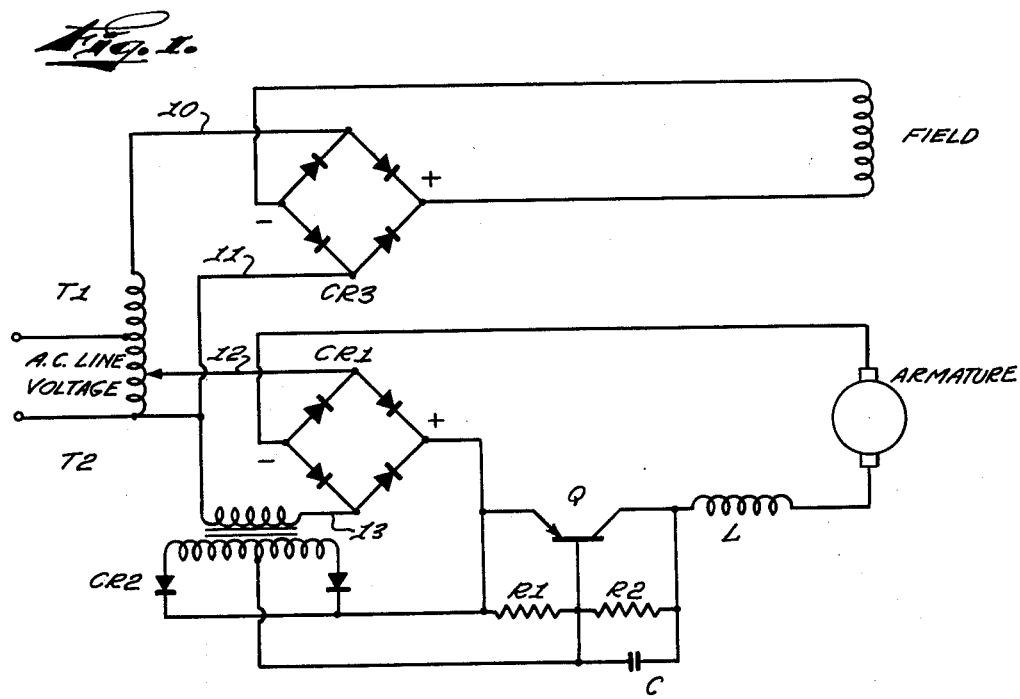
FIG. 1 is a schematic circuit diagram of one form of the invention.

Referring now to FIG. 1 of the drawing, an autotransformer T1 receives the alternating current line voltage and provides two separate output voltages, one being fixed and the other being variable. An output line 10 carries an alternating voltage which is higher than the supply line voltage by a fixed ratio, and which in conjunction with its associated return conductor 11 supplies a bridge rectifier circuit CR3 for energizing the field winding of the motor. No filtering is used, hence the field winding is at all times energized with a fully rectified voltage wave whose amplitude is fixed except for variations in the supply line potential.

An output lead 12 is connected to a variable tap 12a on the auto-transformer T1, and in conjunction with its associated return lead 13 supplies alternating potential to a full-wave bridge rectifier circuit CR1. The output energy of rectifier CR1, as modified by the associated regulating and filtering elements, is then delivered to the motor armature. When a slow motor speed is desired the variable tap 12a on auto-transformer T1 is set to provide a low output voltage on the output lead 12, and when a high motor speed is desired the variable tap is set for a higher output voltage from the auto-transformer.

A transistor Q of the PNP types has its emitter connected to the positive output terminal of the rectifier circuit CR1. A choke coil L is connected between the collector of transistor Q and the motor armature, whose other terminal is connected to the negative output of rectifier CR1. Transistor Q functions as a series regulating element in a conventional manner, being controlled by a novel feedback circuit whose structure and operation are described subsequently herein.

Choke coil L acts to provide some filtering of the ripple voltage delivered from the bridge rectifier CR1. The capacity effect of the armature tends to make the speed regulation worse, especially at high speeds, by increasing the supply voltage at the armature, and this tendency is counteracted by the choke coil L.

A biasing circuit for transistor Q includes a resistor R1 connected between emitter and base and a resistor R2 connected between base and collector.

A feedback transformer T2 has its primary winding connected in series with the lead 13, between auto-transformer T1 and bridge rectifier CR1. The secondary winding of transformer T2 has a center tap 14 which is connected to the base of transistor Q. The two ends of the secondary winding of transformer T2 are connected to the anodes of respective diode rectifiers CR2, the cathodes of both of these rectifiers being connected to the emitter of transistor Q.

It will thus be seen that the magnitude of the current flowing through the primary winding of the feedback transformer is proportional to the current drawn by the armature, and that the value of the rectified voltage delivered across resistor R1 by the rectifier CR2 is therefore likewise proportional to the armature current.

Circuit values are so selected that under no-load conditions of the motor there is an appreciable series voltage drop across transistor Q. As armature current increases the feedback circuit varies the emitter-base bias of transistor Q, reducing its effective series resistance, with the reduction in voltage drop across the transistor being sufficient not only to compensate for increased voltage drops in other portions of the circuit but also to actually raise the voltage across the motor armature. The parameter values are, as nearly as possible, selected so that the voltage rise across the armature will exactly compensate for the increase in the internal voltage drop within the armature, thus maintaining the motor speed constant for all load conditions.

A significant feature of the invention is a capacitor C which is connected in parallel with resistor R2. The primary purpose of capacitor C is to shunt low frequency oscillations induced by changes in mechanical loading of the motor around the collector-base bias resistor R2, so as to prevent a hunting action of the circuit.

Figure 2A:
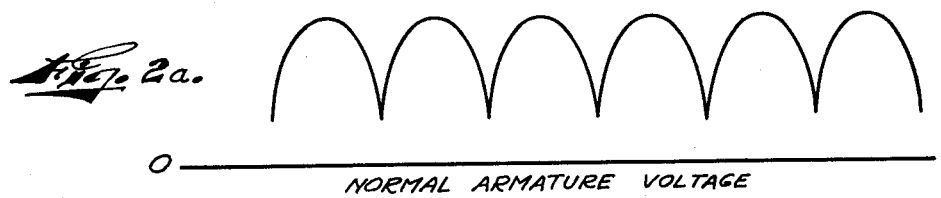
FIG. 2a illustrates the normal wave shape of the armature voltage in the circuit of FIG. 1.
Figure 2B:
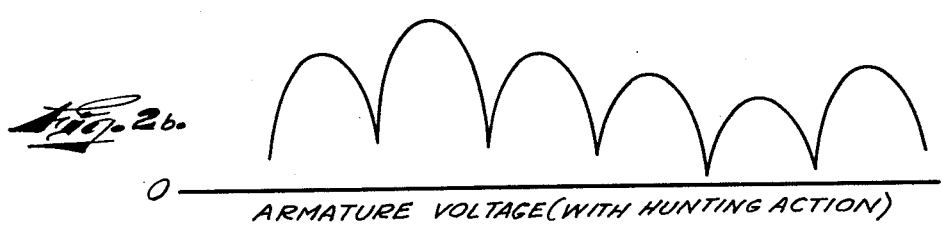
FIG. 2b illustrates a wave shape of the armature voltage that would exist if a hunting action were permitted to occur in the circuit of FIG. 1.

FIG. 2a illustrates the voltage wave shape which normally appears across the motor armature. It will be observed that this wave shape is that of a fully rectified sine wave, in which the ripple component has been smoothed somewhat by the choke coil L. FIG. 2b illustrates the nature of the armature voltage if a hunting action were permitted to occur. In FIG. 2b the basic wave shape of FIG. 2a is preserved, except that the amplitude of the voltage varies up and down in sinusoidal fashion at a frequency which is much lower than that of the alternating current supply line voltage.

Whenever the mechanical loading of the motor changes there is a corresponding change in the armature current, and such current changes are capable of initiating low frequency oscillations at any place in the rectifying and regulation circuit. The feedback action controlling transistor Q is regenerative in nature, as previously explained, hence the undesired oscillations will always build up unless steps are taken to preclude them. One pathway by which the oscillations may reach the base of transistor Q is through collector-base bias resistor R2. This pathway is effectively shunted, however, by the capacitor C, which stabilizes the voltage variations of R2 caused by the oscillations.

Capacitor C could be coupled between emitter and collector of transistor Q, or could be coupled between emitter and base and thus shunt the secondary of T2; however, actual usage has shown that it works best when coupled between collector and base.

Another pathway through which undesired oscillations might reach the base of the transistor is through the feedback transformer. To preclude this possibility the number of turns of the secondary winding of the feedback transformer T2 is made very large in comparison to the number of turns in the primary winding. The secondary winding of T2 therefore presents a large series impedance to the undesired oscillations, effectively preventing them from reaching the base of transistor Q.

In a practical circuit where a $\frac{1}{15}$ horsepower motor is to be controlled, the values of circuit parameters may be chosen as follows. In feedback transformer T2 the primary winding has very few turns and an impedance of about 2 ohms, while the secondary winding has a large number of turns and an impedance of about 10,000 ohms. Resistor R1 has a value of 35 ohms and resistor R2 a value of 5,000 ohms. Capacitor C has a value of 50 microfarads and choke coil L an inductance value of $\frac{1}{10}$ henry. The diodes in all three rectifiers are semi-conductor diodes. Silicon or selenium rectifiers are preferably used as the field and armature rectifiers, while germanium diodes are particularly preferred in the feedback rectifier CR2 because of their low internal voltage drop, which permits a more rapid response to load current changes.

Reference is now made to FIGS. 3 and 4 of the drawings which illustrate another form of the invention that is especially adapted for motors of small power capacity. Referring now to FIG. 3 of the drawing, a direct current motor 18 indicated by a dotted box, and whose speed is to be controlled, has an armature winding AW and a separate field winding FW. A transformer 15 whose output is fused at 17 provides alternating voltage to a rectifier circuit 16. The negative and positive output leads of rectifier circuit 16 are connected to regulator input terminals 0–1 and 0–2, respectively.

Rectifier circuit 16 as presently illustrated is a full-wave bridge circuit consisting of four diodes, and not having an output filter associated therewith it delivers a substantial ripple voltage to the input terminals 0–1 and 0–2. Field winding FW is connected directly across the input terminals 0–1 and 0–2, and is, therefore, subjected to a substantial ripple voltage factor. It will be understood that a half-wave rectifier might be utilized instead of the illustrated full-wave circuit, and in that event a filter would be required, but a significant advantage of the speed control circuit of the present invention is that imperfect filtering of the power source is permissible as a means of reducing the bulk and cost of the equipment.

In the regulator circuit, a first transistor Q–1 has one end of its collector-emitter current conduction path connected to input terminal 0–1 and the other end thereof providing a first output terminal, labeled 0–3. More specifically, Q–1 is a PNP transistor having a base 20, a collector 21, and an emitter 22. Collector 21 is connected to terminal 0–1 while emitter 22 is connected to terminal 0-3. A bias resistor R*b* is connected between terminal 0-1 and base 20.

A feedback resistor R*fb* has one end connected to terminal 0-2 while its other end provides a second output terminal, identified as 0-4. The armature winding AW is coupled between output terminals 0-3 and 0-4, and the purpose of R*fb* is to supply a control voltage for regulating purposes which varies in accordance with the current drawn by the armature.

A voltage divider circuit D has one end 31 connected to output terminal 0-3 while its other end 32 is connected to input terminal 0-2. The voltage divider also has a variable center tap identified as 33.

A second transistor Q-2 has its collector-emitter current conduction path coupled between base 20 of transistor Q-1 and output terminal 0-4. Base 25 of transistor Q-2 is connected to variable center tap 33. Transistor Q-2 is of the PNP type and has its collector 26 connected to base 20 of transistor Q-1 while its emitter 27 is connected to output terminal 0-4.

The main purpose of the voltage divider circuit D is to establish the bias value, and hence the series resistance through, and voltage drop across, transistor Q-2. The output of transistor Q-2 determines the bias value, and hence the series resistance through, and voltage drop across, transistor Q-1. The gain of transistor Q-1, or viewed conversely, its series impedance, determines the output voltage applied across the terminals 0-3 and 0-4 and hence to the armature winding AW.

An essential feature of the invention is the inclusion of filtering means on the output side of the first transistor Q-1. The filtering means includes a condenser C-1 which is connected across the ends 31 and 32 of the voltage divider, and hence is also connected between the terminals 0-2 and 0-3. The filtering means also includes a choke coil L which is coupled in series with the armature winding AW between the terminals 0-3 and 0-4.

Positioning the filter means on the output side of transistor Q-1 has the advantage that this transistor acts as a resistance element for the filter, and also protects the rectifiers from being damaged by surge current to the capacitor. While the use of choke coil L does to some extent improve the quality of operation it may nevertheless be eliminated, since complete filtering of the voltage delivered to the motor armature is not necessary.

Capacitor C-1, as mentioned above, acts as a filtering element for filtering the ripple voltage that is supplied from the rectifier circuit 21. It also acts as a filter for low frequency oscillations originating from the armature circuit, as a result of changes in the mechanical load on the motor, and prevents these oscilaltions from reaching the input of the D.C. amplifier. Thus again, as in the first form of the invention, a positive feedback is achieved without loss of circuit stability.

The voltage divider D as presently illustrated includes a first resistor R-11 connected to terminal 0-3, a second resistor R-12 connected to R-11, and a third resistor R-13 connected to R-12. R-11 and R-13 are fixed while R-12 is variable. Center tap 33 is connected between R-12 and R-13. R-11 and R-12 together, therefore, provide a first resistor means while R-13 provides a second resistor means. While other voltage divider arrangements could be used the arrangement illustrated is preferred because of its minimum cost and maximum ease of control. The purpose of R-12 is to vary the voltage output delivered to variable center tap 33 and hence, as previously described, to establish a particular output voltage at terminals 0-3 and 0-4 so as to obtain the selected motor operating speed. R-11 prevents the conduction of transistor Q-1 from being completely cut off and therefore protects this transistor from excessive operating voltage.

In a practical operating embodiment the circuit values are as follows:

Rectifier output, 65 volts D.C.
Motor rated at 1/100 horsepower
Q-1 transistor type 2N1362
Q-2 transistor type 2N375
Resistor R*b*, 3500 ohms
Resistor R*fb*, 0.5 ohm
Resistor R-13, 10 ohms
Resistor R-12, 5000 ohms
Resistor R-11, 600 ohms
Capacitor C-1, 16 microfarads, electrolytic
Choke coil L, 0.1 henry One of the difficulties in regulating motor speed is that the optimum circuit for selecting a particular speed does not coincide with the optimum circuit for maintaining that speed. As the load torque increases the current drawn by the armature increases, and in order to maintain motor speed constant it is necessary not only to maintain the armature voltage constant but to actually increase it at a rate which approximates a fixed ratio to the current increase. A circuit which provides substantially perfect regulation at a particular speed setting does not do so at other and different speed settings. With the embodiment of the invention illustrated in FIG. 3, with coil L omitted, a substantially perfect speed regulation is obtained whether the armature voltage is initially set at 8 volts, to provide a very low speed, or at 50 volts to provide a near-maximum speed.

When choke coil L is omitted from the circuit, as is actually preferred, capacitor C-1 is particularly necessary in order to obtain correct regulation of high operating speeds. At low speeds the compensation is principally derived from R*fb*, and a value of 1.5 ohms for resistor R*fb* actually provides better compensation at low speeds than does the 0.5 ohm value. However, the values as shown are optimum when the entire range of operating speeds is considered.

While transistors of the PNP type have been illustrated it will be readily appreciated that transistors of the NPN type may be used if desired, and the rectifier output terminals and the capacitor terminals be reversed accordingly. Also, although only two transistors are illustrated, a third transistor may be included in the circuit in a cascade configuration between Q-2 and Q-1.

FIG. 4 illustrates the application of the invention to a series motor. While perfect regulation is not obtained, a considerable measure of compensation is nevertheless achieved.

A number of features, not illustrated in the drawings, are actually preferred for use in the circuit of FIG. 3. One such feature is the inclusion of an additional resistor R-16 connected between collector 21 and base 25, which improves the gain at low speed. Another such feature is connecting the base 25 direct to the upper end of resistor R-12, as well as to a movable tap on resistor R-12, thus shorting a selected portion of the resistor R-12 out of the voltage divider, which improves the overall performance of the circuit. A third specific improvement is including a thermistor, whose resistance drops sharply with increased temperature, as the lowermost element in the voltage divider connected between resistor R-13 and the junction 32. A fourth preferred feature is to connect capacitor C-1 in parallel with resistor R*fb*, rather than in parallel with the voltage divider. A fifth improvement is to include an additional diode connected between the collector 21 and emitter 22, with a polarity opposite to that of transistor Q-1, so as to minimize or eliminate inverse voltage spikes across the transistor. Each of these improvements is of independent value and may be used either with or without the others.

The invention has been described in considerable detail in order to comply with the patent laws by providing a full public disclosure of at least one of its forms. How-

What is claimed is:

1. A direct current motor speed control circuit comprising a source of alternating voltage, a first rectifier coupled to said source, a transistor having its current conduction path coupled in series with said first rectifier and with the motor armature, a feedback transformer having its primary winding coupled in series with said source and said first rectifier whereby the voltage appearing across its secondary winding is proportional to the armature current, bias circuit means for biasing said transistor, a second rectifier coupled between said secondary winding and said bias circuit means for varying the bias of said transistor so as to decrease the effective series resistance thereof and thereby increase the voltage across the armature as the armature current increases, and means associated with said bias circuit means for damping out low frequency electrical oscillations induced by sudden changes in the mechanical loading of the motor.

2. A direct current motor speed control circuit comprising a source of alternating voltage, a first rectifier coupled to said source, a transistor having its emitter-collector conduction path coupled in series between said first rectifier and the motor armature, a feedback transformer having its primary winding in series between said source and said first rectifier whereby the voltage appearing across its secondary winding is proportional to the armature current, a first resistor connected between emitter and base of said transistor, a second resistor connected between collector and base of said transistor, and a second rectifier coupled between said secondary winding and one of said resistors for varying the bias of said transistor so as to decrease the effective series resistance of said transistor and increase the voltage across the armature as the armature current increases.

3. A speed control circuit as claimed in claim 2 wherein said alternating voltage source is a transformer having a variable output tap, the setting of said variable tap being selected in accordance with the motor speed which is desired.

4. A speed control circuit as claimed in claim 2 wherein said first rectifier is a semiconductor-diode full-wave bridge rectifier circut having its input terminals coupled in a series loop configuration with said alternating voltage source and said feedback transformer primary winding, and its output terminals coupled in a series loop configuration with said transistor and the motor armature.

5. A speed control circuit as claimed in claim 2 wherein said secondary winding has a center tap, and said second rectifier includes a pair of semiconductor diodes whose anodes are connected to respective ends of said secondary winding and whose cathodes are connected to each other.

6. A speed control circuit as claimed in claim 2 which further includes an inductance coil coupled in series with said transistor and the motor armature.

7. A speed control circuit as claimed in claim 2 which further includes separate reactance means associated with each of said resistors for shielding said transistor from low frequency oscillations induced in said circuit by sudden changes in the mechanical load of the motor.

8. A speed control circuit as claimed in claim 7 wherein the inductance of said secondary winding of said feedback transformer is many times greater than the inductance of said primary winding of said feedback transformer, thus providing the reactance means associated with said one resistor.

9. A speed control circuit as claimed in claim 7 in which the reactance means associated with the other of said resistors is a capacitor coupled in parallel therewith.

References Cited in the file of this patent

UNITED STATES PATENTS

| | | |
|---|---|---|
| 3,045,169 | Barber | July 17, 1962 |
| 3,093,790 | Ehret | June 11, 1963 |